(12) United States Patent
Gebert

(10) Patent No.: US 11,584,411 B2
(45) Date of Patent: Feb. 21, 2023

(54) METHOD FOR WAGON-TO-WAGON COMMUNICATION, METHOD FOR CONTROLLING INTEGRITY OF A TRAIN AND TRAIN WAGON

(71) Applicant: Thales Management &Services Deutschland GmbH, Ditzingen (DE)

(72) Inventor: Thomas Gebert, Bretzfeld-Bitzfeld (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 319 days.

(21) Appl. No.: 16/797,355

(22) Filed: Feb. 21, 2020

(65) Prior Publication Data

US 2020/0269889 A1 Aug. 27, 2020

(30) Foreign Application Priority Data

Feb. 22, 2019 (EP) .................................... 19158768

(51) Int. Cl.
| | |
|---|---|
| *H04W 4/80* | (2018.01) |
| *B61L 15/00* | (2006.01) |
| *H04W 4/46* | (2018.01) |
| *B61L 25/02* | (2006.01) |
| *B61L 25/04* | (2006.01) |
| *H04L 5/00* | (2006.01) |

(52) U.S. Cl.
CPC ......... *B61L 15/0027* (2013.01); *B61L 25/028* (2013.01); *B61L 25/04* (2013.01); *H04L 5/0055* (2013.01); *H04W 4/46* (2018.02); *H04W 4/80* (2018.02)

(58) Field of Classification Search
CPC combination set(s) only.
See application file for complete search history.

(56) References Cited

U.S. PATENT DOCUMENTS

| | | | |
|---|---|---|---|
| 5,986,579 A | 11/1999 | Halvorson | |
| 6,680,918 B1 | 1/2004 | Haley | |
| 2007/0282494 A1* | 12/2007 | Moffitt ...................... | B60L 9/00 701/19 |

(Continued)

FOREIGN PATENT DOCUMENTS

| | | |
|---|---|---|
| CN | 106347411 A | 1/2017 |
| DE | 19858922 C1 | 7/2000 |

(Continued)

*Primary Examiner* — Hanh N Nguyen
(74) *Attorney, Agent, or Firm* — Orbit IP

(57) ABSTRACT

A method for wagon-to-wagon communication between wagons of a train is disclosed. The train includes a first train wagon and at least one further train wagon, the first train wagon having a first transmitter/receiver device, and the further train wagon having a further transmitter/receiver device. The first transmitter/receiver device sends a request message using short distance communication. The further transmitter/receiver device sends an acknowledgement to the first transmitter/receiver device using short distance communication. The first transmitter/receiver device sends a first identification code identifying the first train wagon to the further train wagon. A method for checking train integrity and a train wagon is also disclosed.

13 Claims, 2 Drawing Sheets

(56) References Cited

U.S. PATENT DOCUMENTS

| | | | | |
|---|---|---|---|---|
| 2010/0130124 A1* | 5/2010 | Teeter | ................ | B61L 15/0027 |
| | | | | 455/15 |
| 2017/0164178 A1* | 6/2017 | Anjum | ................... | G08G 1/017 |
| 2021/0217259 A1* | 7/2021 | Odejerte, Jr. | ..... | H04W 52/0254 |

FOREIGN PATENT DOCUMENTS

| | | |
|---|---|---|
| DE | 199 34 640 C1 | 11/2000 |
| DE | 10 2007 040165 A1 | 2/2009 |
| DE | 10 2011 007588 A1 | 10/2012 |
| DE | 2 531 391 B1 | 12/2012 |
| DE | 20 2016 004 730 U1 | 10/2016 |
| DE | 3 228 519 A1 | 10/2017 |
| EP | 1205370 A1 | 5/2002 |
| EP | 2 531 391 B1 | 12/2012 |
| EP | 3 228 519 A1 | 10/2017 |
| GB | 9807051 | 6/1998 |
| KR | 20140000433 A | 1/2014 |
| WO | 98/19885 A1 | 5/1998 |

* cited by examiner

METHOD FOR WAGON-TO-WAGON COMMUNICATION, METHOD FOR CONTROLLING INTEGRITY OF A TRAIN AND TRAIN WAGON

CROSS-REFERENCE TO RELATED APPLICATIONS

This application claims priority to European Patent Application EP 19158768.2 filed Feb. 22, 2019, the entire contents of which are hereby incorporated in full by this reference.

DESCRIPTION

Field of the Invention

The invention concerns a method for wagon-to-wagon communication between wagons of a train. The train may comprise a first train wagon, for example a locomotive, and at least one further train wagon. The invention also concerns a method for controlling train integrity and a train wagon.

Background of the Invention

A previous method is known from EP 2 531 391 B1.

Communication between railway elements is required for controlling train integrity. In order to determine the actual train length it is known to provide a head-of-train device in the railcar and an end-of-train device in the last wagon of a train which communicate with each other via Ethernet, radio communication or cable as taught in EP 3 228 519 A1. Yet, with this method train integrity can only be determined reliably at straight lines, since the distance between head-of-train device and end-of-train device does not comply with the train length if the train is in a curve.

In EP 2 531 391 B1 a train is disclosed in which train integrity modules, so called TIMs, are installed at each wagon of the train. The train integrity modules exchange data by means of close-range communication, like WLAN, during a calibration phase when exiting a so called shunting area. Sensor data like speed, position, moving direction are also exchanged between the train integrity modules. The data of the train integrity modules are transmitted to a control center, where the data of different train integrity modules are acquired and compared with the purpose of monitoring the integrity of the train. Yet, the train integrity modules need to be equipped with digital maps, as they need to be able to recognize the shunting areas.

SUMMARY OF THE INVENTION

Object of the Invention

It is an object of the invention to provide an improved method for wagon-to-wagon communication and an improved method for train integrity control. It is a further object of the invention to provide a train wagon adapted to perform the methods.

Description of the Invention

This object is solved by a method for wagon-to-wagon communication according to the first independent claim. This object is also solved by a method for checking train integrity according to the second independent claim and a train wagon according to the third independent claim.

The method for wagon-to-wagon communication between wagons of a train uses a first transmitter/receiver device of a first train wagon of the train. The method comprises at least the following steps:
Sending a request message using short distance communication.
Receiving an acknowledgement using short distance communication from a further train wagon.
Sending a first identification code identifying the first train wagon to the further train wagon.

In step A) sending a request message using short distance communication might for example be a close-up range distance sensor sending short distance waves like for example ultrasound. If in step B) a response is received, e.g. by receiving a reflection of the ultrasound waves, then communication is continued with step C).

The train comprises at least a first train wagon and a further train wagon. The first train wagon has a first transmitter receiver device, which may be for example a backend transmitter/receiver device which is located at for example the rear coupling region of the first train wagon.

The further train wagon has a further transmitter/receiver device, preferably a frontend transmitter/receiver device. The further train wagon may also have a backend transmitter/receiver device. The frontend transmitter/receiver device of the further train wagon may be located at the front coupling region of the further train wagon. The backend transmitter/receiver device of the further train wagon may be located at the rear coupling region of the further train wagon.

The first backend transmitter/receiver device may send the request message using short distance communication. With this step, the first train wagon may check if a communication partner is present in the proximity of the first train wagon. This has the advantage that for example a locomotive can check if it is by itself or has wagons attached to it at for example the rear side. This check might for example be done by a close-up range distance sensor.

If a further train wagon is present in the proximity of the first train wagon, a transmitter/receiver device of the further train wagon may receive the request message and respond by sending an acknowledgement back to the transmitter/receiver device of the first train wagon. The transmitter/receiver device of the further train wagon may send the acknowledgement using short distance communication. The transmitter/receiver device of the first train wagon may then receive the acknowledgement using short distance communication. When receiving the acknowledgement, the first train wagon can then detect that a further train wagon is in proximity. The transmitter/receiver device of the first train wagon may then send a first identification code identifying the first train wagon. The further train wagon may receive the first identification code.

In an embodiment on the invention, the method may also comprise a step D, where the first train wagon receives a list of identification codes, the list comprising at least the first identification code and a further identification code. The further identification code then identifies the further train wagon. Preferably, the identification codes provide a unique identification for each wagon. Preferably, the first train wagon receives the list of identification codes with its backend transmitter/receiver device.

For the case that the train comprises n train wagons, the following steps may be performed for the different train wagons i=2 . . . n.

The i-th train wagon, in particular the i-th backend transmitter/receiver device, sends a request using short distance communication. Sending the request might be done by a close-up range distance sensor using for example ultrasound. The (i+1)-th train wagon, in particular the (i+1)-th-frontend transmitter/receiver device, sends an acknowledgement to the i-th train wagon, in particular the i-th backend transmitter/receiver device, using short distance communication. In the case of a request message via ultrasound, this acknowledgement might simply be the reflection of the ultrasound signal sent by a close-up range distance sensor of the i-th train wagon. The i-th train wagon, in particular the i-th backend transmitter/receiver device, sends an i-th identification code identifying the i-th train wagon to the (i+1)-th train wagon. The i-th train wagon may also send the list of identification codes, the list comprising identification codes for wagons 1 to i. Preferably, the i-th train wagon comprises an i-th frontend transmitter/receiver and an i-th backend transmitter/receiver device. The described method enables the i-th train wagon to send out a message using short distance communication and upon reception of an acknowledgement to establish a communication to the (i+1)-th train wagon, which has sent the acknowledgement.

The method is then performed for all n train wagons until the last train wagon for i=n will send out a request using short distance communication and as there is no additional train wagon in the proximity of the backend of the i=n-th train wagon, this n-th train wagon will not receive a response to its request message. The n-th train wagon will thus not receive an identification code to add to the list of identification codes.

The n-th train wagon can then send back the complete list of identification codes comprising the identification codes of all n train wagons. The first i=1 train wagon, for example a locomotive, may then preferably receive the list of identification codes comprising all the identification codes of all the n train wagons. The locomotive preferably performs the reception of the list of identification codes using the first backend transmitter/receiver device. This list of identification codes can then for example be used by a control and evaluation unit in the locomotive to control the train integrity.

There are different embodiments possible to send back the list of identification codes, comprising the identification codes of all n train wagons, from the n-th train wagon back to the locomotive. These embodiments will be described in the following. A mixture of the embodiments may also be implemented, combining features of the different embodiments.

One embodiment is that the backend transmitter/receiver device of each train wagon sends the list of identification codes to the frontend transmitter/receiver device of the same train wagon. This may for example happen via medium distance communication or wired communication. Between two successive train wagons the list of identification codes can then be sent from the frontend transmitter/receiver of the i-th train wagon to the backend transmitter/receiver of the (i−1)-th train wagon via short distance communication and so on.

In another embodiment, the list of identification codes, the list comprising the identification codes of all n train wagons, is transmitted from the backend or frontend transmitter/receiver of the i-th train wagon to the backend or frontend transmitter/receiver of the (i−1)-th train wagon via medium distance communication. In this embodiment, only one communication step from one train wagon to the other is necessary.

In another embodiment, the list of identification codes is transmitted from the backend transmitter/receiver device of the n-th train wagon to the first wagon using medium distance communication. In this embodiment, only one communication step might be necessary from the last wagon of the train to the locomotive.

Within the train, the transmitter/receiver devices of the wagons may form a chain together, by communicating from one device to the next and so on. In a preferred embodiment of the invention, a frontend transmitter/receiver device and a backend transmitter/receiver device of each train wagon are mounted in proximity of opposite coupling regions of the respective train wagons. Within the same train wagon, the frontend transmitter/receiver device and the backend transmitter/receiver device of the same train wagon can communicate with each other using medium distance communication and/or wired communication. The communication between the frontend and the backend transmitter/receiver device of one train wagon can be performed in both directions, i.e. it is a bidirectional communication connection. For an i-th train wagon for example in one direction a list of identification codes comprising the identification codes of train wagons 1 to i can be transmitted, this is for example during a start sequence. In the other direction, the list of identification codes comprising the identification codes of all n train wagons, may be transmitted.

Close-up range distance sensor can for example be an ultrasonic sound distance sensor, radar distance sensor, and so on. Other implementations of close-up distance sensors are possible. The close-up range distance sensor may be part of the short range transmitter/receiver device, a separate device is also possible. Preferably, the measurement range for the close-up distance sensor is less than 5 meters, in particular less than 2 meters. This ensures that a wagon is not detected as being part of the train if it stands/runs on a neighboring track.

Short distance communication can for example be data transmission via ultrasound, dedicated short range communication (DSRC), radar, short distance radio transmission, infrared radiation, and so on. Other implementations of short range communication are possible. Preferably, the communication range for short range communication is less than 5 meters, in particular less than 2 meters. This ensures that a wagon is not detected as being part of the train if it stands/runs on a neighboring track.

In one embodiment of the invention, communication via ultrasound may be used for the communication between one wagon of train and another wagon of a train. An ultrasound transmitter of the one train wagon may then modulate information on the ultrasound wave, which may be demodulated by an ultrasound receiver of the other train wagon. Information may then be exchanged between the train wagons using short distance communication via ultrasound.

Medium distance communication may comprise any kind of wireless communication with the ability to bridge the distance between backend transmitter/receiver and frontend transmitter/receiver of the same wagon. Medium distance communication with range up to 300 m may for example comprise Bluetooth, WLAN/WiFi/WPAN (according to IEEE 802.11), ZigBee, ZWave, Enocean and similar. In the case that more than one train wagon of the train is equipped with medium distance communication, a local area network could be set up among these wagons of the train that are equipped with medium distance communication.

The method described above can be used as a start sequence for generating a list of identification codes, comprising the identification codes of all n train wagons of a train. In such a train with n train wagons, each train wagon might have a backend transmitter/receiver and a frontend transmitter/receiver. The first wagon, e.g. the locomotive, might have a first backend transmitter/receiver and a control evaluation unit. The first train wagon, e.g. the locomotive, might or might not have a frontend transmitter/receiver. The control evaluation unit might then be used to check the integrity of the train using the list of identification codes generated with the start sequence. The control evaluation unit might then receive the list of identification codes, and store the received list of identification codes. The list of identification codes is then repeatedly generated to generate subsequent lists of identification codes comprising the identification codes of all n wagons connected to the train. The generation of the subsequent lists of identification codes may be done by going through the start sequence again. The generation of the subsequent lists of identification codes may also be done by a transmitter/receiver device of a train wagon contacting a transmitter/receiver device of the next train wagon directly and so on. This would be possible, because the next train wagon is known via the list of identification codes.

The train integrity may then be determined by the first train wagon, e.g. the locomotive, preferably within its control evaluation unit by comparing the stored list of identification codes, for example generated during the start sequence, to the repeatedly generated list of identification codes. With this list of identification codes not only the integrity of the train can be checked, but also other information about the train can be collected: As each identification code of a wagon is uniquely assigned to this wagon, there might be other attributes to this identification code, e.g. length of wagon or weight of wagon etc. By combining the attribute data with a list of identification codes, for example train length, train weight etc. might be calculated. The train integrity may also be determined by a remote computing center, like for example a central control center. For doing this the list of identification codes could for example be sent via long-distance communication means to the central control center, where it could be compared to a stored list of identification codes which had been sent before.

The invention further concerns a train wagon comprising a transmitter/receiver device. The transmitter/receiver device comprises circuitry configured to send a request message using short distance communication and to receive an acknowledgement using short distance communication. It is further configured to send an identification code identifying the train wagon using short distance communication or medium distance communication. The train wagon is thus able to identify itself to a neighboring train wagon within its proximity, as the transmitter/receiver is preferably mounted in proximity to a coupling region of the train wagon.

The transmitter/receiver device of the train wagon is then preferably equipped with a power supply, e.g. a battery or rechargeable battery, a solar panel combined with a battery or rechargeable battery, a Piezo module with battery or rechargeable battery, a wind turbine converting air flow combined with a battery or rechargeable battery, a wheel boss or axle-coupled generator, a generator using air pressure of the train's brake system, etc. All these power supplies allow for an autonomous power supply to the transmitter/receiver device. This is particularly useful for a cargo train.

Further advantages can be extracted from the description and the enclosed drawings. The features mentioned above and below can be used in accordance with the invention either individually and collectively in any combination. The embodiments mentioned are not to be understood as exhaustive, but are rather embodiments of the invention.

BRIEF DESCRIPTION OF THE DRAWINGS

Further features and advantages of the invention are shown in the drawings.

DETAILED DESCRIPTION OF THE PREFERRED EMBODIMENTS

Figure 1:
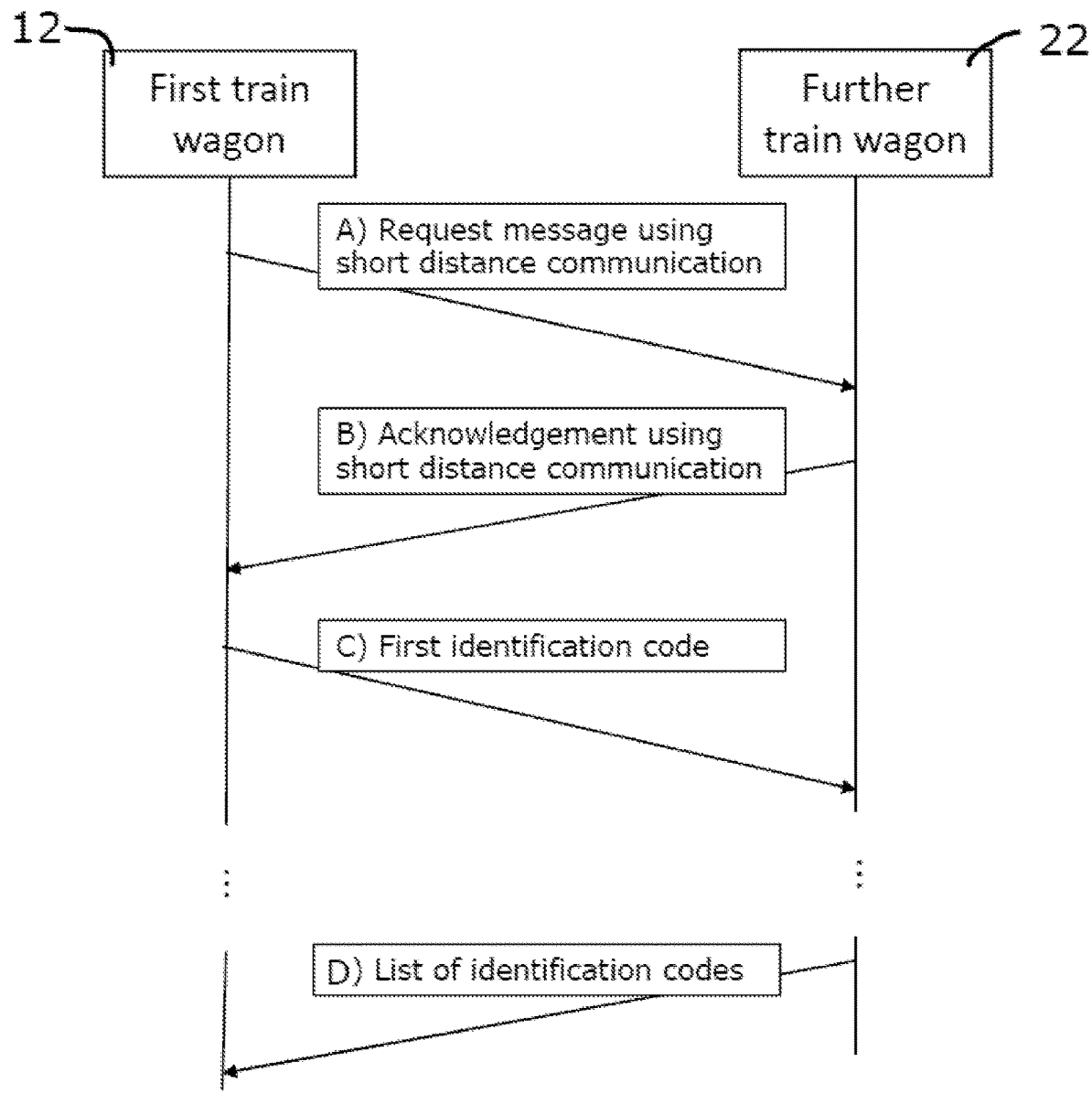
FIG. 1 shows an illustration of an embodiment of the method according to the invention.

In FIG. 1, an embodiment of a method for setting up communication between a first train wagon 12 and a further train wagon 22 of a train 10. In step A, the first train wagon sends a request message using short distance communication. This might be a close-up range distance sensor sending a signal. This request message is an unaddressed message, i.e. it is not addressed to a specific communication partner. It is rather for checking if a potential communication partner is in proximity available. In step B, the further train 22 wagon which received the request message sends an acknowledgement using short distance communication. This acknowledgement is an acknowledgement that the request message from step A has been received by the further train wagon 22. The first train wagon 12 receives the acknowledgement sent in step B using short distance communication. In response to the acknowledgement, the first train wagon 12 sends a first identification code identifying the first train wagon 12 to the further train wagon 22. Sending the first identification code may be done using short distance communication or may be done using another kind of communication, for example medium distance communication. A sequence is then performed by successively making contact from each train wagon i, i=1 . . . n to the next train wagon i+1 and forwarding a list of identification codes of the train wagons from the first train wagon i=1 to the current train wagon i. After the sequence has been completed for all n wagons 12, 22, 32, 42 . . . of the train 10, a list of identification codes is sent back, the list of identification codes identifying all n wagons 12, 22, 32, 42 . . . of the train 10. The list of identification codes is then received by the first train wagon and may there be used to check the integrity of the train 10. The first train wagon then knows not only the number of wagons connected to the train, but also exactly which wagons are connected to the train, as each wagon is uniquely identified by its identification code.

By repeating the start sequence a stored list of identification codes can be compared to a newly generated list of identification codes and when there are discrepancies in between the lists, the loss of the integrity of the train 10 can be determined.

Figure 2:
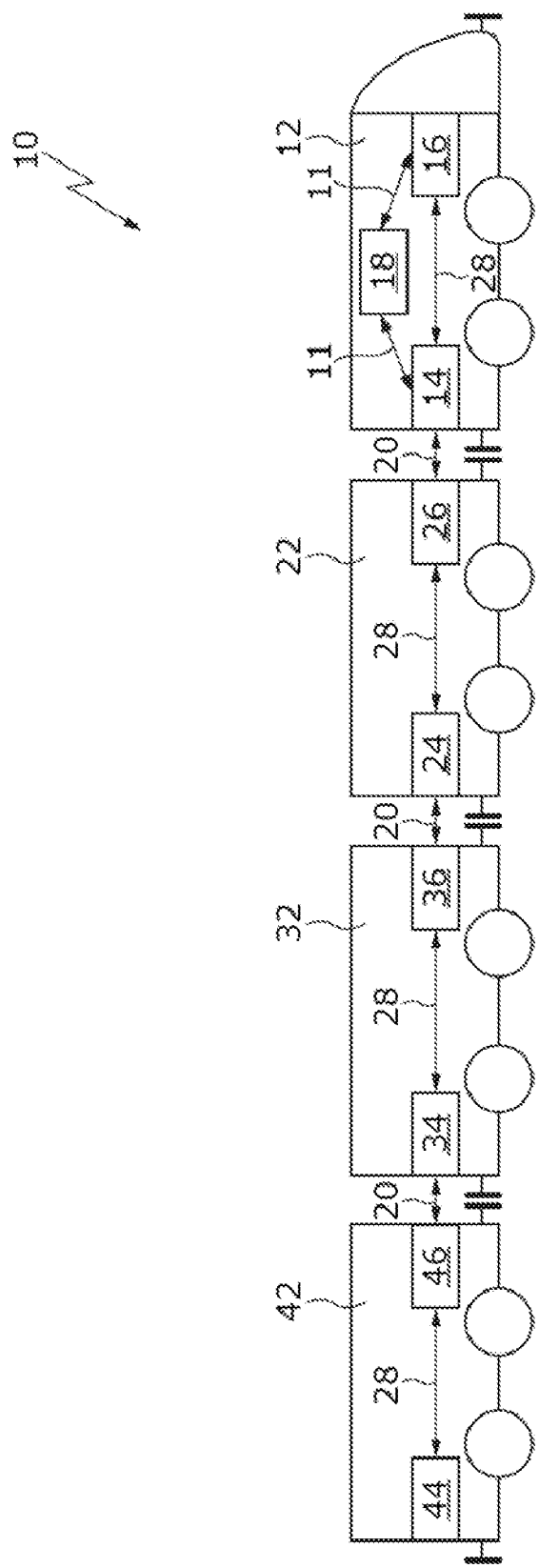
FIG. 2 shows an embodiment of a train comprising wagons according to the invention.

In FIG. 2, a train 10 is shown comprising a first train wagon 12, which is the locomotive, and train wagons 22, 32 and 42. The locomotive 12 comprises a frontend transmitter/receiver device 16 and a backend transmitter/receiver device 14. The backend transmitter/receiver 14 device and the frontend transmitter/receiver 16 device are connected via a medium distance communication 28. The locomotive 12 further comprises a control evaluation unit 18 which communicates with the backend transmitter/receiver device 14 over a communication line 11. The control evaluation device 18 also communicates with the frontend transmitter/receiver device 16 via communication line 11. Communication line 11 may be for example wired or wireless.

Between the train wagons 12, 22, 32 and 42 there is short distance communication 20 possible. The short distance communication 20 is established between a backend transmitter/receiver device 14, 24, 34, 44 and a frontend transmitter/receiver device 16, 26, 36, 46 in close proximity. For example, between the first train wagon 12 and the second train wagon 22 there is a short distance communication 20 in between the first backend transmitter/receiver device 14 and the second frontend transmitter/receiver device 26 and so on.

The communication between a frontend transmitter/receiver 16, 26, 36, 46 device and a backend transmitter/receiver device 14, 24, 34, 44 within each train wagon 12, 22, 32, 42 may happen via medium distance communication 28. This communication between a frontend transmitter/receiver device 16, 26, 36, 46 and a backend transmitter/receiver device 14, 24, 34, 44 within the same train wagon 12, 22, 32, 42 may also be via wired connection.

For the frontend transmitter/receiver device 16 short distance communication is for example possible if the locomotive 12 is connected to another wagon or another locomotive.

Each wagon 12, 22, 32, 42 has a unique identification code, which can be further broken down to a unique identification code for a backend transmitter/receiver device 14, 24, 34, 44 of such a train wagon 12, 22, 32, 42 and the frontend transmitter/receiver device 16, 26, 36, 46 for such a train wagon 12, 22, 32, 42. For example, for the backend transmitter/receiver device 14, 24, 34, 44, its unique identification code may be the identification code of the train wagon 12, 22, 32, 42 with an added ".B". In the same way, the identification code for the frontend transmitter/receiver device 16, 26, 36, 46 of a train wagon 12, 22, 32, 42 might be the identification code of the train wagon 12, 22, 32, 42 with an added ".A".

The transmit range of the short distance communication 20 is for example about 1-2 meters, so that the distance of the wagon clutch, i.e. the coupling region between two neighboring wagons, can be bridged. Choosing a short distance communication for such a communication avoids accessing the wrong device which is further away. This avoids errors.

In each frontend and backend transmitter/receiver device 14, 16, 24, 26, 34, 36, 44, 46 of each train wagon 12, 22, 32, 42 further required data can be stored, e.g. the wagon length of the respective train wagon. Also, the list of identification codes might be stored in each transmitter/receiver device 14, 16, 24, 26, 34, 36, 44, 46 for forwarding in either direction during the course of the method.

The control evaluation unit 18 of the locomotive 12 might comprises a user interface, e.g. keyboard, softkeys and/or a screen for access for the personnel of the train 10. For example, for starting the train integrity check, the driver of the train may start a train integrity check by pushing a button on the control and evaluation unit 18. Alternatively, the train integrity check can be started fully automated when the train sets into motion.

For track bound vehicles like train it is important for the operator of the track network to ensure the safety of the traffic in the network. The vehicles in this network are usually made up of a locomotive and one or more wagons attached to the locomotive. The locomotive might be pulling the wagons or it might be pushing the wagons. Wagons might be designed to carry people or cargo. In particular cargo wagons might take many different forms depending of the kind of cargo that they are designed to carry. When a train comprising the locomotive and the wagon sets of and starts its journey, it is important for the operator of the track network to ensure that the train stays together as planned, i.e. that the integrity of the train is preserved. This has to be checked regularly either centrally by the operator and/or locally in the train. For this invention a close-up range distance sensor and/or short distance communication is used to check and/or establish if a wagon of a train has a neighboring wagon and subsequently to set up a list of all the wagons comprised in a train. This list can then be used to verify that the train is still intact, i.e. has not lost one or more of its wagons.

LIST OF REFERENCE SIGNS 10 train
11 communication line
12 first train wagon
14 first backend transmitter receiver device
16 first frontend transmitter receiver device
18 control evaluation unit
20 short distance communication
22 second train wagon
24 second backend transmitter receiver device
26 second frontend transmitter receiver device
28 medium distance communication
30 frontend transmitter receiver device
32 third train wagon
34 third backend transmitter receiver device
36 third frontend transmitter receiver device
42 fourth train wagon
44 fourth backend transmitter receiver device
46 fourth frontend transmitter receiver device

What is claimed is:

1. A method for wagon-to-wagon communication between wagons of a train, the train comprising a first train wagon and at least one further train wagon, the first train wagon comprising a first transmitter/receiver device, and the further train wagon comprising a further transmitter/receiver device, the method comprising the steps of:
  A) the first transmitter/receiver device sending a request message using short distance communication;
  B) the further transmitter/receiver device sending an acknowledgement to the first transmitter/receiver device using short distance communication; and
  C) the first transmitter/receiver device sending a first identification code identifying the first train wagon to the further train wagon;
  wherein the train comprises n train wagons, wherein i=2 . . . n the i-th train wagon comprises an i-th backend transmitter/receiver device and the (i+1)-th train wagon an (i+1)-th frontend transmitter/receiver device, the method comprising the following steps:
  a) the i-th backend transmitter/receiver device sending a request using short distance communication;
  b) the (i+1)-th frontend transmitter/receiver device sending an acknowledgement to the i-th backend transmitter/receiver device using short distance communication; and
  c) the i-th backend transmitter/receiver device sending a list of identification codes to the (i+1)-th train wagon, the list comprising an (i+1)-th identification code identifying the (i−1)-th train wagon and an i-th identification code identifying the i-th train wagon;
  wherein a list of identification codes is transmitted within the i-th train wagon, i=2 . . . n from the backend transmitter/receiver device to the frontend transmitter/receiver device via medium distance communication or wired communication, where the list comprises the identification codes of all n train wagons, and wherein the list of identification codes is transmitted between two successive wagons from the frontend transmitter/receiver device of the i-th train wagon to backend transmitter/receiver device of the (i−1)-th train wagon via short distance communication.

2. The method of claim 1, wherein the first transmitter/receiver device is a first backend transmitter/receiver device and the further transmitter/receiver device is a further frontend transmitter/receiver device.

3. The method of claim 1, further comprising the step of:
D) the first backend transmitter/receiver device of the first train wagon receiving a list of identification codes, the list comprising at least the first identification code and a further identification code, the further identification code identifying the further train wagon.

4. The method of claim 1, wherein the train comprises n train wagons, the first train wagon is a locomotive, and wherein the locomotive, in particular the first backend transmitter/receiver device of the locomotive, receives a list of identification codes, the list comprising the identification codes of all n train wagons.

5. The method of claim 1, wherein a list of identification codes is transmitted from the backend or frontend transmitter/receiver device of the i-th train wagon to the backend or frontend transmitter/receiver device of the (i−1)-th train wagon via medium distance communication, wherein the list comprises the identification codes of all n train wagons.

6. The method of claim 1, wherein a list of identification codes, the list comprising the identification codes of all n train wagons, is transmitted from the backend transmitter/receiver device of the n-th wagon to the first wagon, in particular to the backend transmitter/receiver device of the first wagon, using medium distance communication.

7. The method of claim 1, wherein the frontend transmitter/receiver device and the backend transmitter/receiver device of each train wagon are mounted in proximity of opposite coupling regions of the respective train wagon, wherein the frontend transmitter/receiver device and the backend transmitter/receiver device of the same train wagon communicate with each other using medium distance communication or wired communication.

8. The method of claim 1, wherein short distance communication comprises distance checking via ultrasound and/or radar and data transmission via ultrasound, dedicated short-range communication (DSRC), radar, short-distance radio transmission, infrared radiation.

9. The method of claim 1, wherein medium distance communication comprises communication via a Local Area Network, Bluetooth, WLAN/WiFi/WPAN (according to IEEE 802.11), ZigBee, ZWave, Enocean.

10. A method for controlling the integrity of a train, the train comprising n train wagons, the first wagon having a first backend transmitter/receiver device and a control/evaluation unit, and the i-th train wagon, with i=2 . . . n, having an i-th backend controller and an i-th frontend controller, the method comprising the steps of:
performing a start sequence for generating a list of identification codes using the method of wagon-to wagon communication according to claim 1;
transmitting the list of identification codes to the control/evaluation unit;
storing the received list of identification codes;
repeatedly generating subsequent lists of identification codes comprising identification codes of all wagons coupled to the train; and
determining the train integrity by comparing the stored list of identification codes to the received list of identification codes.

11. A train wagon comprising a transmitter/receiver device, the transmitter/receiver device being configured to perform the method according to claim 1, comprising circuitry configured to send a request message using short distance communication and to receive an acknowledgement using short distance communication, and circuitry configured to send an identification code identifying the train wagon using short distance communication or medium distance communication.

12. The train wagon of claim 11, wherein the transmitter/receiver device is mounted in proximity to a coupling region of the wagon.

13. The train wagon of claim 11, wherein an electrical power supply for the transmitter/receiver device, the power supply comprising one or more of the following:
a solar panel with battery or rechargeable battery;
a piezo module with battery or rechargeable battery;
a wind turbine converting airflow;
a wheel boss or axle-coupled generator; or
a generator using air pressure of the train's brake system.

* * * * *

UNITED STATES PATENT AND TRADEMARK OFFICE
CERTIFICATE OF CORRECTION

| | |
|---|---|
| PATENT NO. | : 11,584,411 B2 |
| APPLICATION NO. | : 16/797355 |
| DATED | : February 21, 2023 |
| INVENTOR(S) | : Thomas Gebert |

It is certified that error appears in the above-identified patent and that said Letters Patent is hereby corrected as shown below:

On the Title Page

Column 1, the Applicant's name, "&Services" should read --& Services--.

In the Claims

Column 8, Claim 1, Line 56, "(i+1)-th" should read --(i-1)-th--.

Column 8, Claim 1, Line 63, "where" should read --wherein--.

Signed and Sealed this
Eleventh Day of April, 2023

*Katherine Kelly Vidal*

Katherine Kelly Vidal
*Director of the United States Patent and Trademark Office*